US010379294B1

(12) United States Patent
Chen et al.

(10) Patent No.: US 10,379,294 B1
(45) Date of Patent: Aug. 13, 2019

(54) MULTI-DIRECTIONAL FIBER OPTIC CONNECTOR

(71) Applicant: SOLTEAM OPTO, INC., Taoyuan (TW)

(72) Inventors: Chin-Feng Chen, Taoyuan (TW); Po-Kai Wang, Taoyuan (TW); Chang-Ming Lee, Taoyuan (TW)

(73) Assignee: SOLTEAM OPTO, INC., Taoyuan (TW)

( * ) Notice: Subject to any disclaimer, the term of this patent is extended or adjusted under 35 U.S.C. 154(b) by 0 days.

(21) Appl. No.: 16/151,007

(22) Filed: Oct. 3, 2018

(30) Foreign Application Priority Data

Jan. 22, 2018 (TW) ............................ 107102243 A

(51) Int. Cl.
*G02B 6/38* (2006.01)
*G02B 6/44* (2006.01)

(52) U.S. Cl.
CPC ......... *G02B 6/3809* (2013.01); *G02B 6/4471* (2013.01)

(58) Field of Classification Search
CPC ........................... G02B 6/3809; G02B 6/4471
USPC ............................................................ 385/59
See application file for complete search history.

(56) References Cited

U.S. PATENT DOCUMENTS

2003/0071318 A1* 4/2003 Wang .................. G02B 6/4204 257/434
2014/0178013 A1* 6/2014 Nielson ................ G02B 6/3861 385/83

FOREIGN PATENT DOCUMENTS

JP 05093821 A * 4/1993 .............. G02B 6/36

* cited by examiner

*Primary Examiner* — Jerry M Blevins
(74) *Attorney, Agent, or Firm* — Muncy, Geissler, Olds & Lowe, P.C.

(57) ABSTRACT

A multi-directional fiber optic connector includes a housing defining therein a mating-connection chamber, a mating-connection portion having an insertion hole in communication with the accommodation chamber and a plurality of guide grooves equiangularly spaced around the insertion hole for guiding a fiber optic lead end connector of a fiber optic cable into the insertion hole in one of a series of angular positions and an accommodation chamber located at an opposite side of said mating-connection chamber, said mating-connection portion comprising, and an optical device mounted in the accommodation chamber for optical communication with the inserted fiber optic cable.

2 Claims, 13 Drawing Sheets

MULTI-DIRECTIONAL FIBER OPTIC CONNECTOR

This application claims the priority benefit of Taiwan patent application number 107102243, filed on Jan. 22, 2018.

BACKGROUND OF THE INVENTION

1. Field of the Invention

The present invention relates to fiber optic technology and more particularly, to a multi-directional fiber optic connector, which provides multiple guide grooves around an insertion hole of a housing for guiding the insertion of a fiber optic lead end connector of a fiber optic cable into the insertion hole so that the fiber optic lead end connector can be conveniently inserted into the insertion hole in one of a series of angular positions.

2. Description of the Related Art

With the ever-changing communications technology and the use of telephones, networks and other communications equipment, the distance between people is getting closer and closer. A communication equipment uses a cable to transmit electrical signal or optical signal. For optical signal transmission, fiber optic cable is an optical signal transmission medium that achieves fastest transmission. Optical fiber is made of non-metal materials such as plastic or glass. For the advantages of excellent electromagnetic resistance and anti-interference capabilities, high bandwidth, light weight, long signal transmission distance and good confidentiality, making the optical fiber, optical fiber is widely used to replace traditional metal transmission lines.

At present, there are various optical fiber connectors available on the market for the connection of the fiber optic cable for transmitting or receiving optical signals. FIGS. 12 and 13 illustrate a fiber optic connector according to the prior art. As illustrated, the fiber optic connector comprises a first housing A, a second housing B, a dust cover C and an electronic device D. The first housing A comprises two plug plates A1 bilaterally disposed at a top side thereof, two clamping plates A2 bilaterally disposed at a bottom side thereof, and a first accommodation chamber A3 defined between the two clamping plates A2. The second housing B comprises a second accommodation chamber B1 defined in one side thereof, two mounting grooves B2 symmetrically disposed at two opposite lateral sides thereof relative to the second accommodation chamber B1, a top opening B3 disposed above the mounting grooves B2, an insertion port B5 defined in an opposite side thereof in communication with the second accommodation chamber B1, and two guide grooves B4 horizontally defined in the insertion port B5 in communication with the top opening B3. The dust cover C comprises two pivot pins C1 symmetrically disposed at two opposite sides thereof and respectively loaded with a respective torsion spring C2.

In installation, the dust cover C is inserted into the second accommodation chamber B1 of the second housing B, and then the pivot pins C1 of the dust cover C are respectively coupled to the guide grooves B4 of the second housing B, and then the electronic device D is inserted into the first accommodation chamber A3 of the first housing A, and then the first housing A is attached to the second housing B with the plug plates A1 respectively inserted into the guide grooves B4 and stopped against the respective pivot pins C1 of the dust cover C and the clamping plates A2 respectively hooked in the respective mounting grooves B2 of the second housing B. Thus, the electronic device D is held between the first housing A and the second housing B. Further, electrical pins E are downwardly inserted through the bottom side of the second housing B for bonding to an external circuit board.

According to this prior art design of fiber optic connector, two different molds must be used for making the first housing A and the second housing B; the plug plates A1 of the first housing A are respectively inserted into the guide grooves B4 of the second housing B to stop the respective pivot pins C1 of the dust cover C in position. The preparation of the dust cover C, the first housing A and the second housing B is complicated and expensive.

In application, the fiber optic cable with the attached fiber optic lead end connector is inserted into the insertion port B5 in the correct direction to bias the dust cover C in the second housing B and to further force the dust cover C into abutment against an inner top wall of the second housing B for optical communication between a fiber optic core of the fiber optic cable the electronic device D. If the fiber optic cable is inserted with the fiber optic lead end connector into the insertion port B5 in a wrong direction, the fiber optic core of the fiber optic cable can be abutted against an inside wall of the second housing B, causing fiber optic core twist or damage. Therefore, this prior art fiber optic connector is still not satisfactory in function.

How to solve the problem of the aforesaid prior art fiber optic connector that the matching fiber optic connector with the attached fiber optic lead end connector must inserted into the insertion port in a specific direction and the problems that the fiber optic connector is complicated to operate and can easily cause fiber optic core damage is the direction of improvement the manufacturers engaged in this industry need to study.

SUMMARY OF THE INVENTION

The present invention has been accomplished under the circumstances in view. It is therefore the main object of the present invention to provide a multi-directional fiber optic connector, which facilitates plugging and unplugging of the fiber optic cable with the attached fiber optic lead end connector in one of a series of angular positions To achieve this and other objects of the present invention, a multi-directional fiber optic connector comprises the housing and an optical device. The housing comprises a mating-connection chamber, a mating-connection portion located at one side of the mating-connection chamber, and an accommodation chamber located at an opposite side of the mating-connection chamber. The mating-connection portion comprises the insertion hole in communication with the accommodation chamber, and a plurality of guide grooves equiangularly spaced around the insertion hole for guiding the fiber optic lead end connector of the fiber optic cable in any of a series of angular position into the insertion hole. The optical device is mounted in the accommodation chamber, comprising a light source transceiver facing toward the mating-connection chamber and a plurality of electrical pins extended out of the housing for bonding to an external circuit board. Subject to the arrangement of the guide grooves, the fiber optic lead end connector can be plugged into the insertion hole in one of a series of angular position to connect the fiber optic cable to the housing without causing impact between the fiber optic core of the fiber optic cable and the inside wall of the housing, effectively enhancing the utility of fiber optic connector.

Preferably, the insertion hole and the housing are configured to provide a rectangular or polygonal shape having multiple sides. Further, the guide grooves are respectively located in the multiple sides of the insertion hole.

Preferably, each guide groove comprises an arched groove extending toward the mating-connection chamber, and two rectangular grooves disposed at two opposite lateral sides of the arched groove. Further, the depth of the rectangular grooves is smaller than the depth of the arched groove.

Preferably, the housing further comprises a plug hole cut through a top wall thereof within an external locating groove and disposed in communication with the mating-connection chamber, a light-shielding device detachably mounted in the plug hole to block between the mating-connection chamber and the accommodation chamber, and a position-limiting member mounted to the housing to hold down the light-shielding device in the plug hole.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
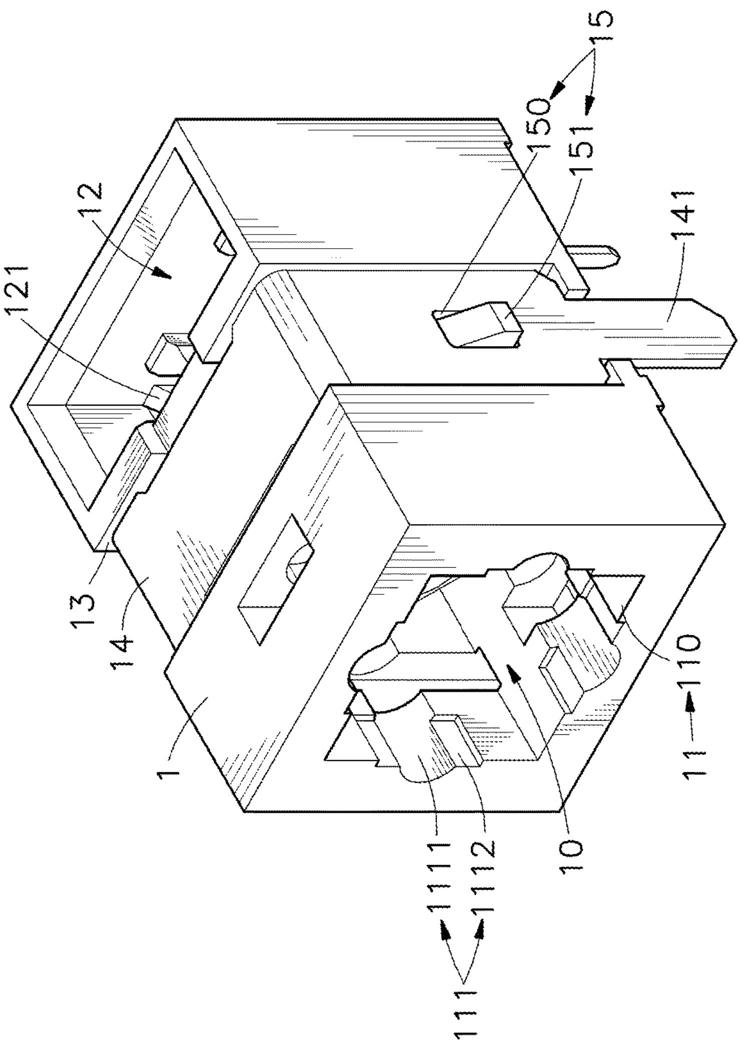
FIG. 1 is an oblique top elevational view of a multi-directional fiber optic connector in accordance with the present invention.
Figure 2:
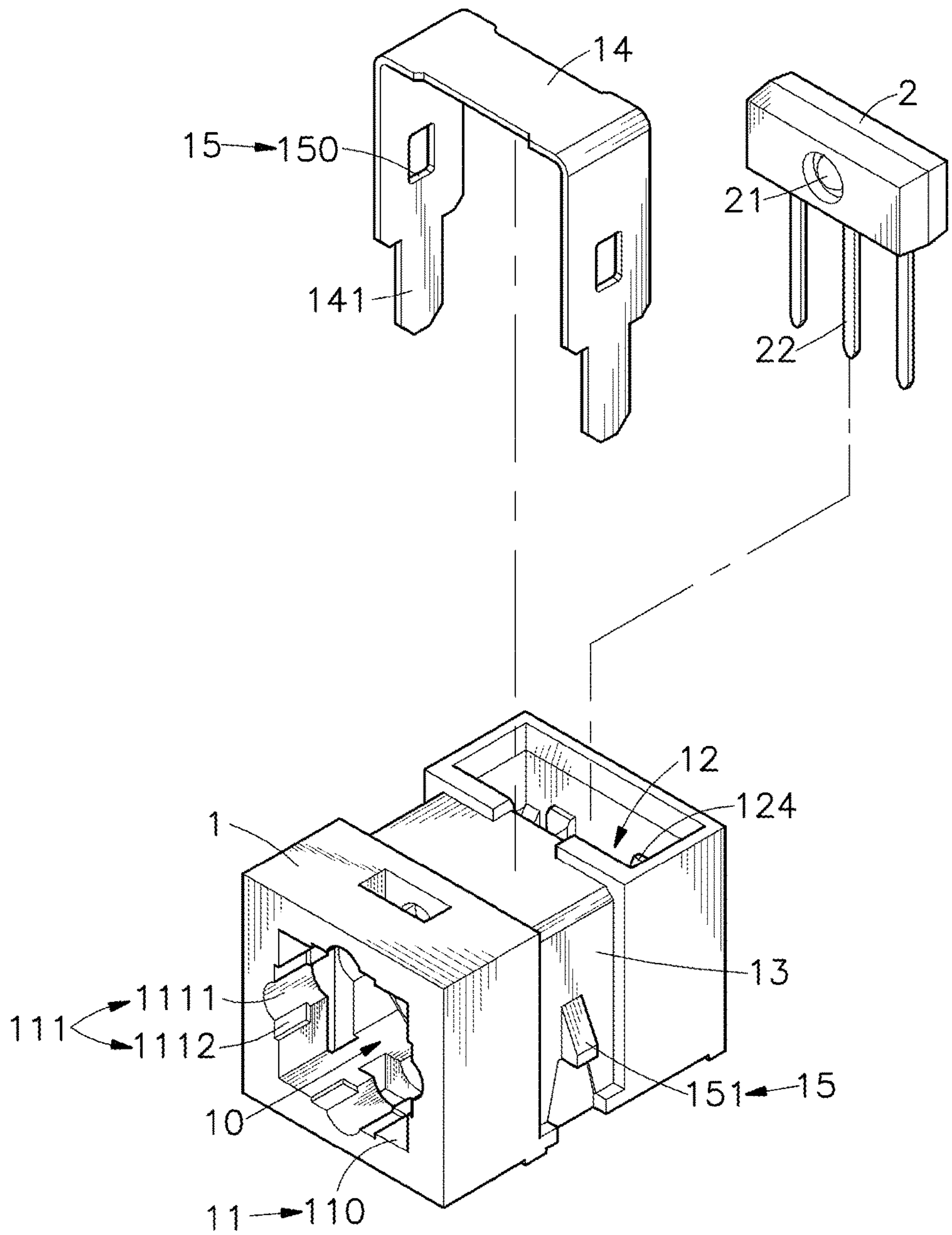
FIG. 2 is an exploded view of the multi-directional fiber optic connector in accordance with the present invention.
Figure 3:
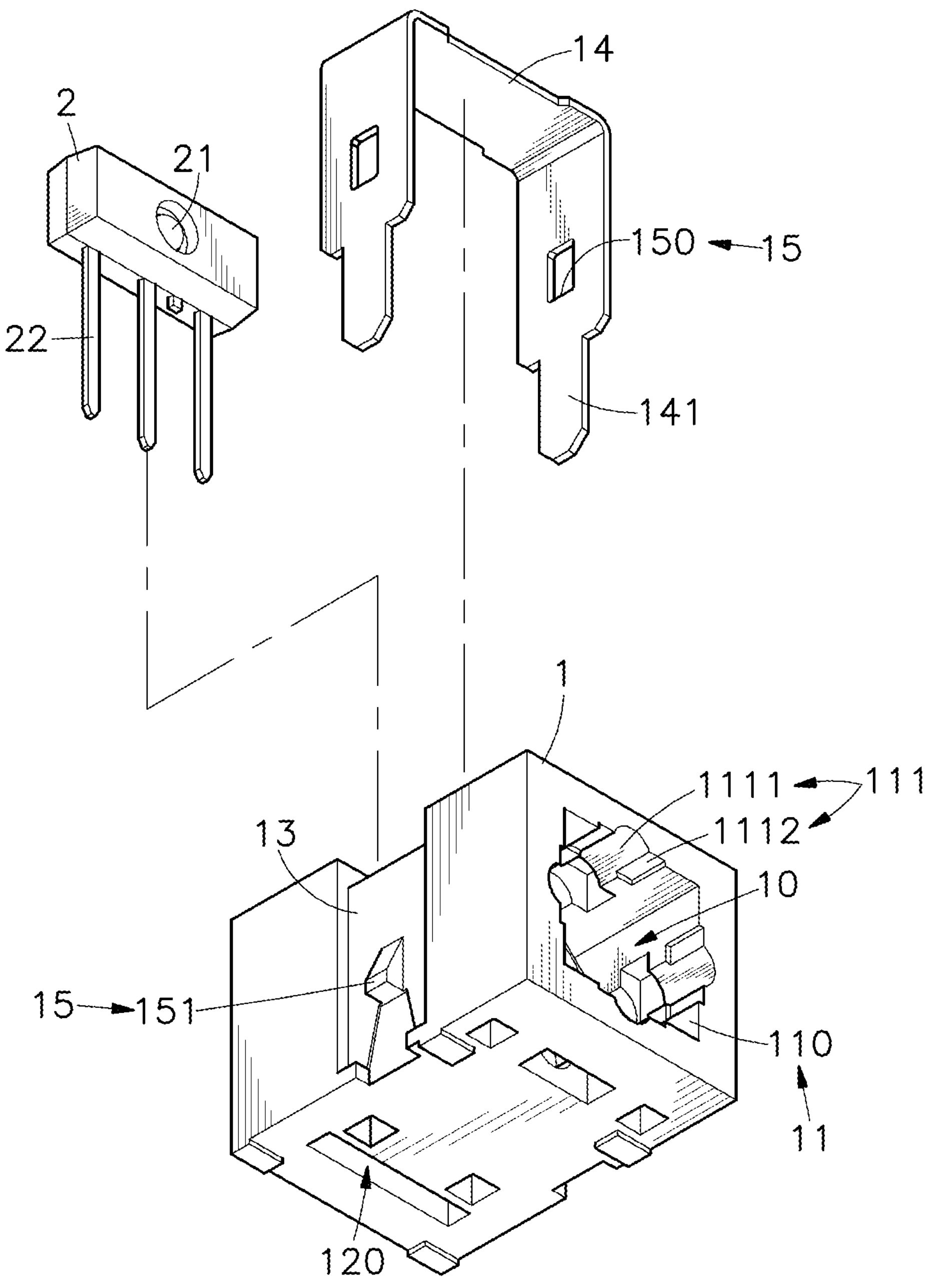
FIG. 3 corresponds to FIG. 2 when viewed from another angle.
Figure 4:
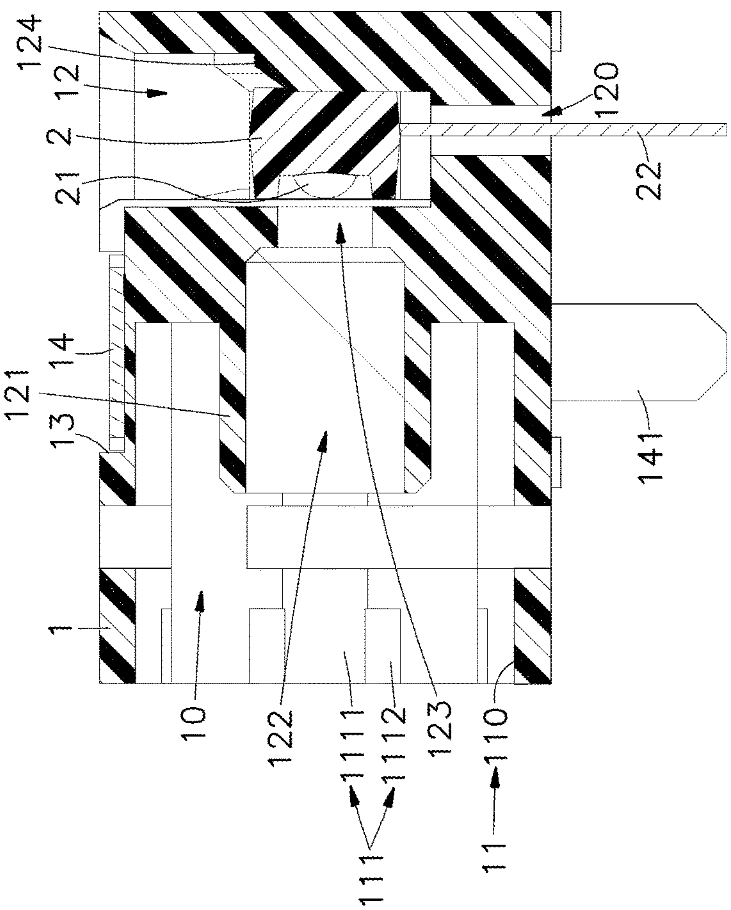
FIG. 4 is a sectional side view of the multi-directional fiber optic connector in accordance with the present invention.
Figure 5:
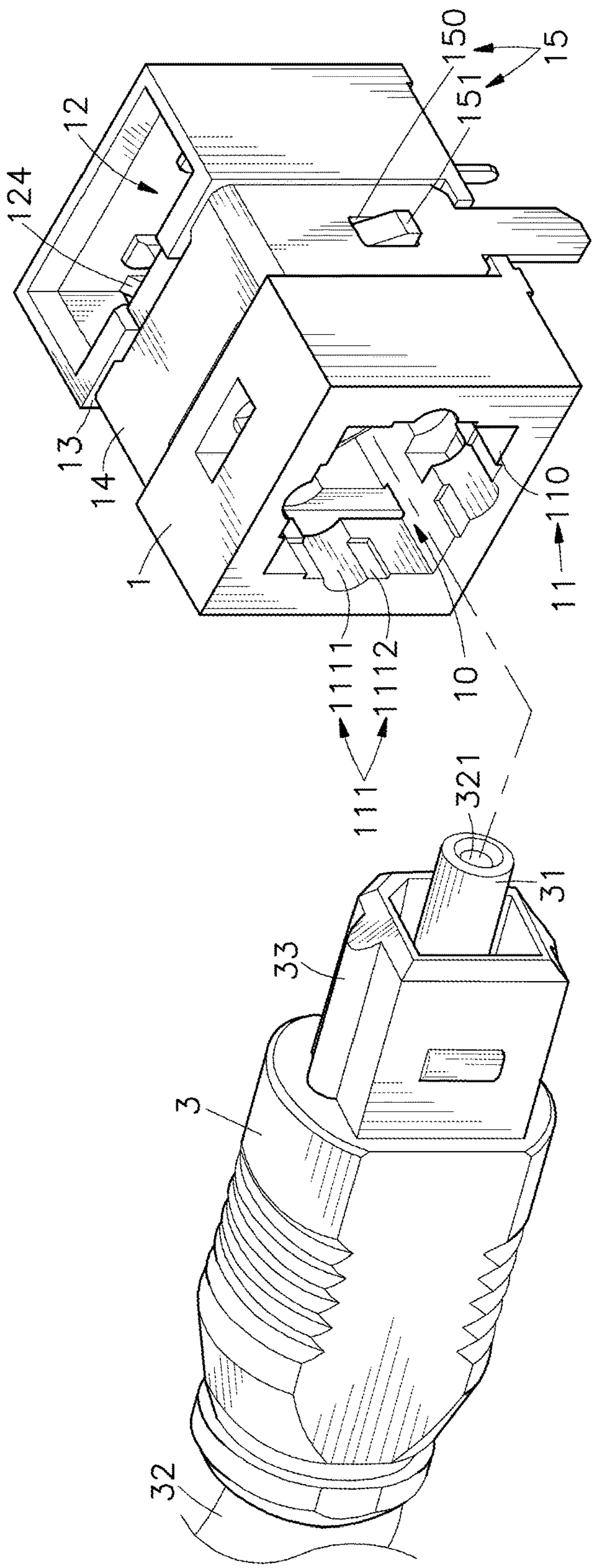
FIG. 5 in an exploded view illustrating the relationship between the guide grooves in the housing of the multi-directional fiber optic connector and the position-limiting ribs on the fiber optic lead end connector of the fiber optic cable.

Referring to FIGS. 1-5, a multi-directional fiber optic connector in accordance with the present invention is shown. The multi-directional fiber optic connector comprises a housing 1 and an optical device 2.

The housing 1 comprises a mating-connection chamber 10 defined therein, a mating-connection portion 11 that is located at one side of the mating-connection chamber 10, comprising an insertion hole 110 disposed in axial alignment with the mating-connection chamber 10 and a plurality of guide grooves 111 equiangularly spaced around the insertion hole 110 each guide groove 111 comprising an arched groove 1111 extending toward the mating-connection chamber 10 and two rectangular grooves 1112 disposed at two opposite lateral sides of the arched groove 1111, an accommodation chamber 12 located at an opposite side of and disposed in communication with the mating-connection chamber 10, a connecting bush 121 axially suspending in the mating-connection chamber 10, a docking channel 122 defined in the connecting bush 121 in communication between the mating-connection chamber 10 and the accommodation chamber 12, an optical channel 123 of reduced diameter disposed in communication between the docking channel 122 and the accommodation chamber 12, an external locating groove 13 extended around the periphery thereof, a position-limiting member 14 detachably mounted in the external locating groove 13, and fastening means 15 to secure the position-limiting member 14 to the external locating groove 13. The position-limiting member 14 is an inverted-U plate, comprising two positioning plug tips 141 respectively extended from two opposite lateral sides thereof and bilaterally suspending outside of a bottom side of the housing 1, The fastening means 15 comprises a plurality of hook blocks 151 symmetrically protruded from two opposite lateral sides of the periphery of the housing 1 within the external locating groove 13, and a plurality of hook holes 150 symmetrically located on the two opposite lateral sides of the position-limiting member 14 and respectively forced into engagement with the respective hook blocks 151.

The optical device 2 comprises a light source transceiver 21 located at a front side thereof, and a plurality of electrical pins 22 downwardly extended from a bottom side thereof.

In installation, mount the optical device 2 in the accommodation chamber 12 of the housing 1 to keep the light source transceiver 21 in axial alignment with the optical channel 123, the docking channel 122 and the mating-connection chamber 10. Thereafter, mount the position-limiting member 14 in the external locating groove 13 to force the hook holes 150 of the fastening means 15 into engagement with the respective hook blocks 151. Thus, a fiber optic cable 32 with an attached fiber optic lead end connector 3 can be inserted into the insertion hole 110 of the mating-connection portion 11 at one side of the mating-connection chamber 10 of the housing 1 in one of multiple directions for optical communication with the optical device 2. Thus, the housing 1 and the optical device 2 are assembled to constitute the fiber optic connector.

Further, the insertion hole 110 of the mating-connection portion 11 and the housing 1 can be configured to provide a rectangular or polygonal profile. The guide groove 111 is located in each of the multiple sides of the insertion hole 110 where the arched groove 1111 is located on the middle and extending toward the mating-connection chamber 10 and the rectangular grooves 1112 are disposed at two opposite lateral sides of the arched groove 1111; the depth of the rectangular grooves 1112 is smaller than the depth of the arched groove 1111. When the insertion hole 110 of the housing 1 is not used, a flexible light-shielding device (not shown) can be inserted into the housing 1 to block the light emitted by the light source transceiver 21 of the optical device 2.

The housing 1 further comprises at least one rib 124 raised from an inside wall of the accommodation chamber 12 for abutment against the light source transceiver 21 of the inserted optical device 2 to enhance positioning stability of the optical device 2 in the accommodation chamber 12, a guiding channel 120 cut through a bottom wall thereof in communication with the accommodation chamber 12 for the passing of the electrical pins 22 of the inserted optical device 2 to the outside of the housing 1 so that the electrical pins 22 of the inserted optical device 2 can be electrically bonded to an external circuit board using through hole or SMT technology.

Figure 6:
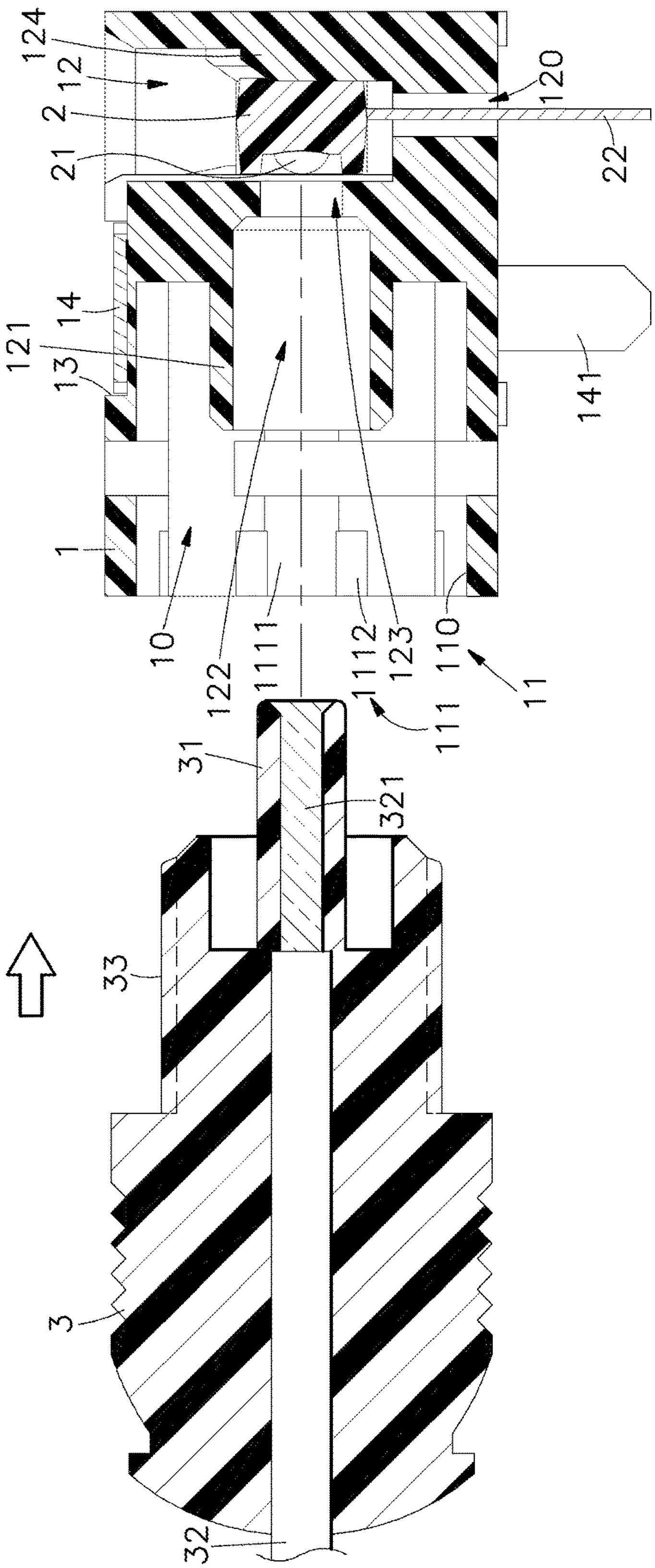
FIG. 6 is a schematic sectional applied view, illustrating the fiber optic lead end connector aimed at the insertion hole of the multi-directional fiber optic connector.
Figure 7:
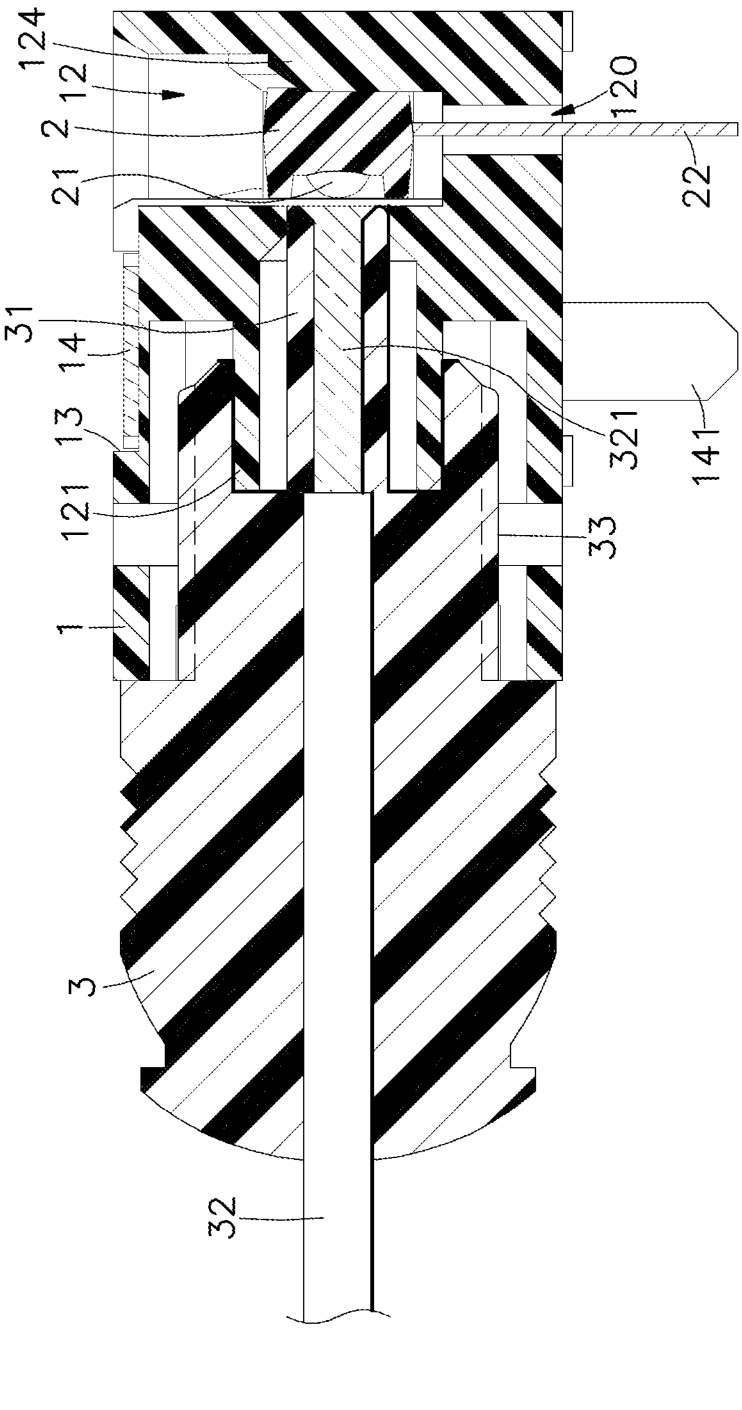
FIG. 7 corresponds to FIG. 6, illustrating the fiber optic lead end connector inserted into the insertion hole of the multi-directional fiber optic connector and the fiber optic core in axial alignment with the light source transceiver of the optical device.
Figure 8:
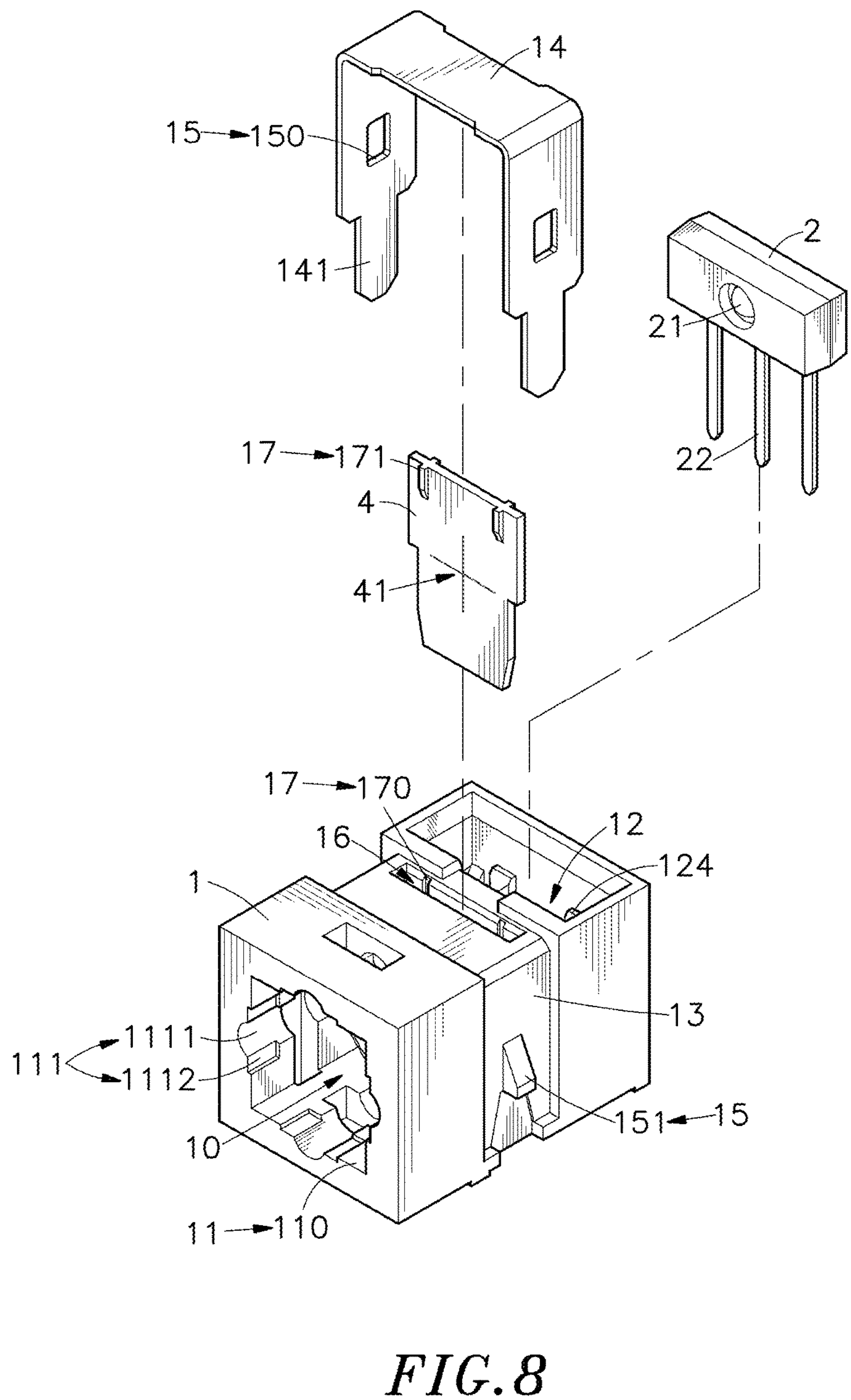
FIG. 8 is an exploded view on an alternate form of the multi-directional fiber optic connector in accordance with the present invention.
Figure 9:
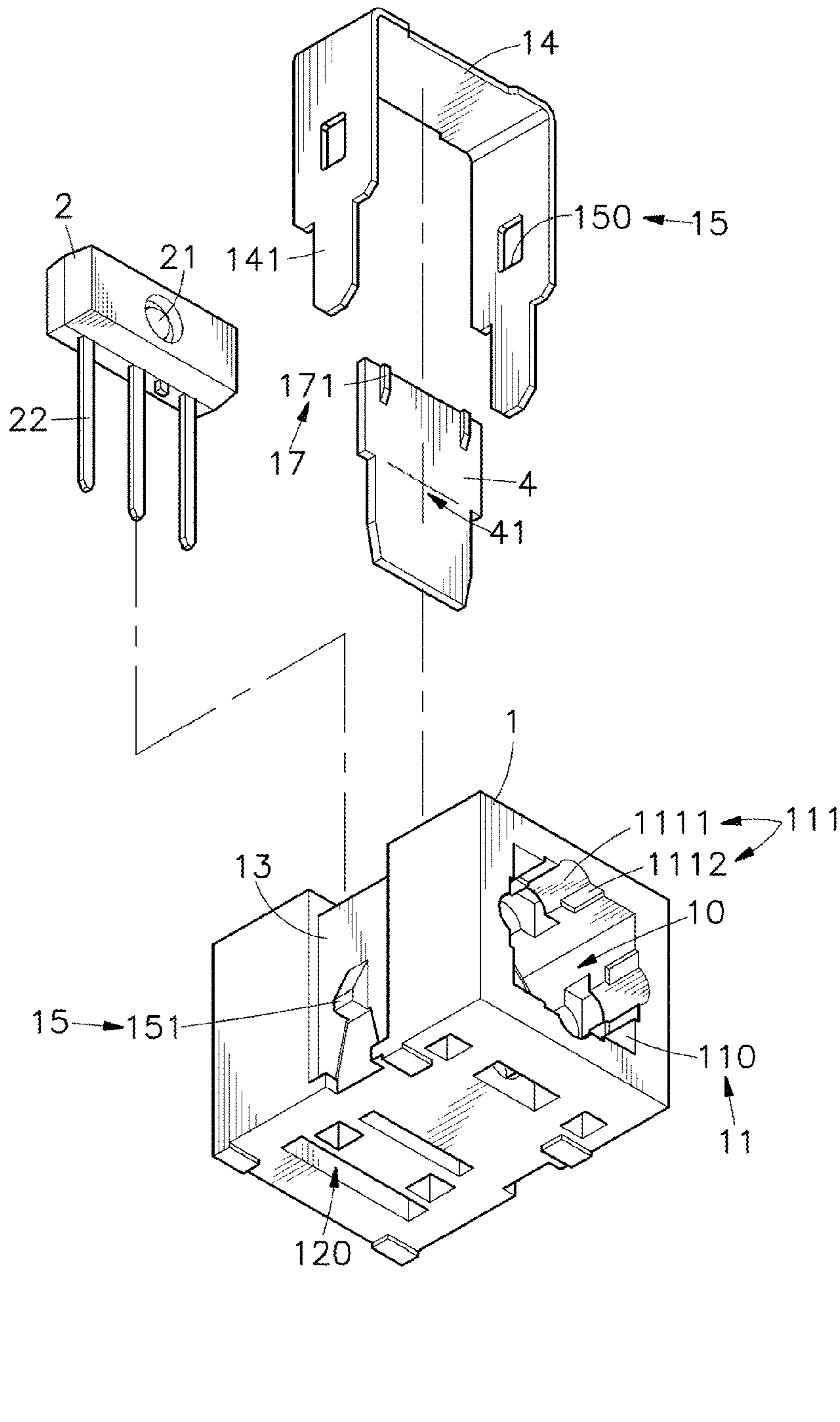
FIG. 9 corresponds to FIG. 8 when viewed from another direction.
Figure 10:
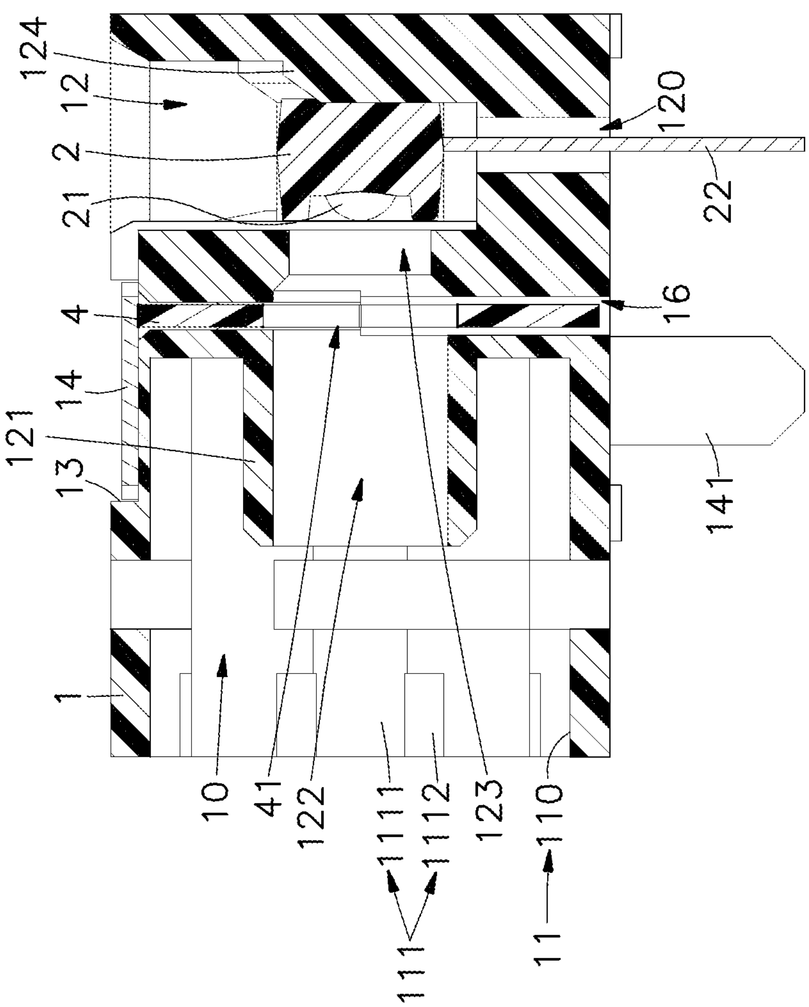
FIG. 10 is a sectional side assembly view of the alternate form of the multi-directional fiber optic connector in accordance with the present invention.
Figure 11:
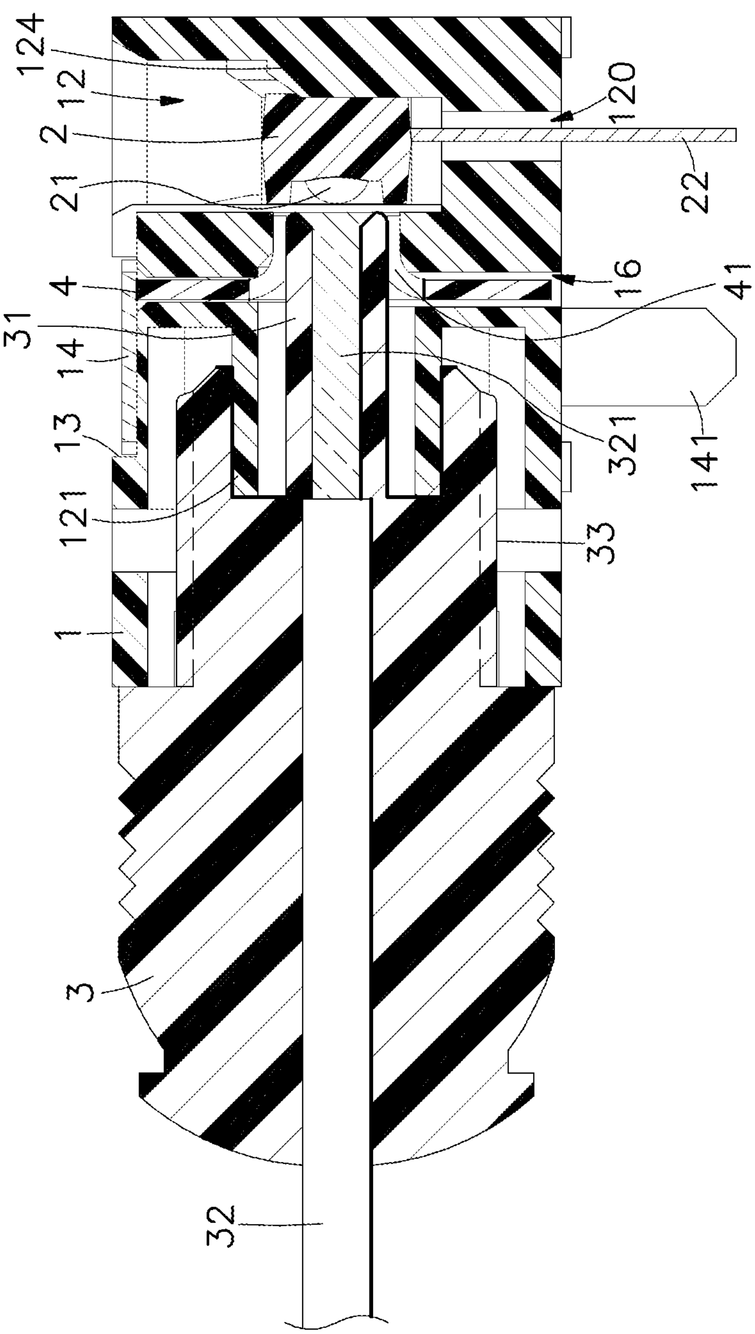
FIG. 11 is an applied view of the alternate form of the multi-directional fiber optic connector in accordance with the present invention, illustrating the fiber optic lead end connector inserted into the insertion hole of the multi-directional fiber optic connector, the light-shielding device elastically deformed, and the fiber optic core in axial alignment with the light source transceiver of the optical device.
Figure 12:
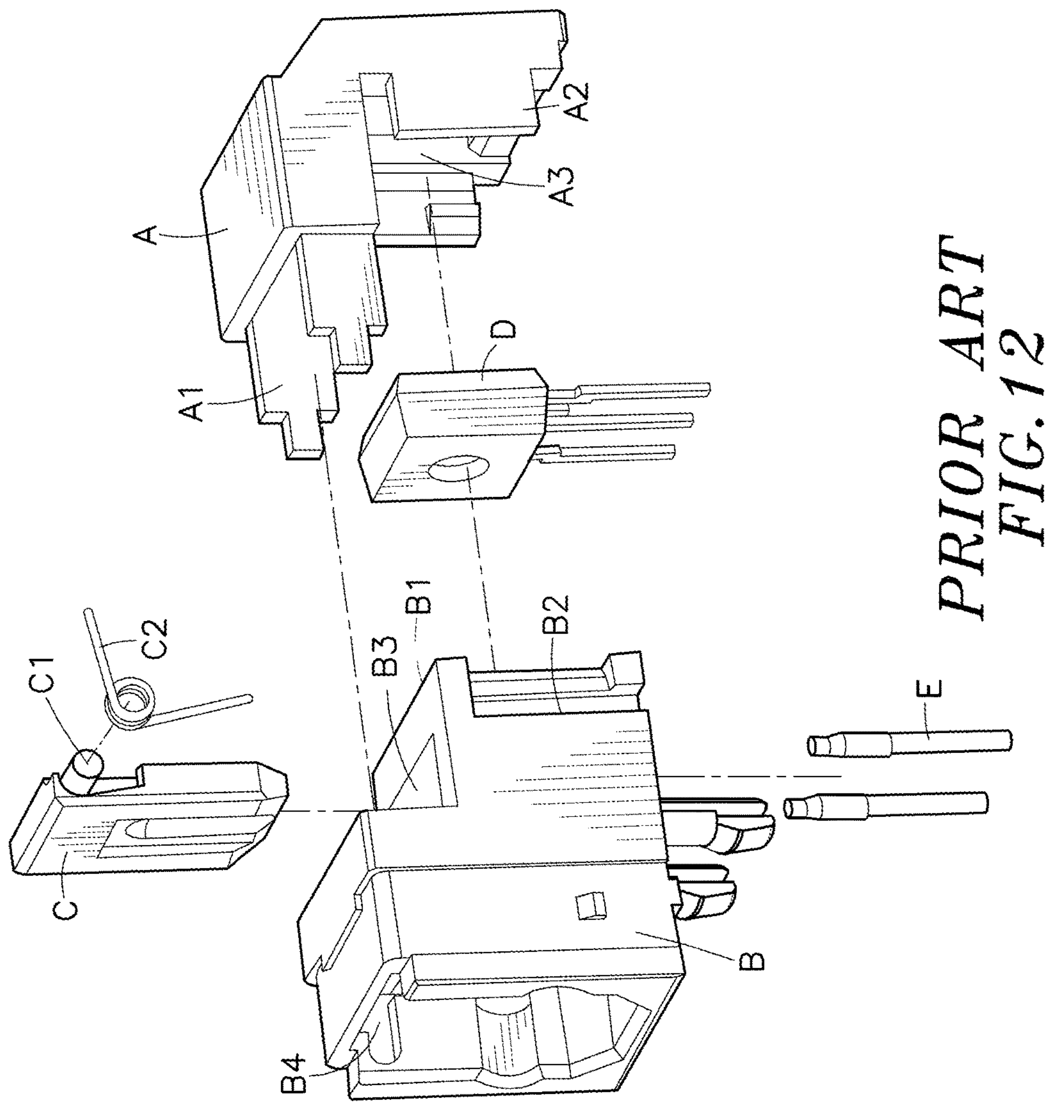
FIG. 12 is an exploded view of a fiber optic connector according to the prior art.
Figure 13:
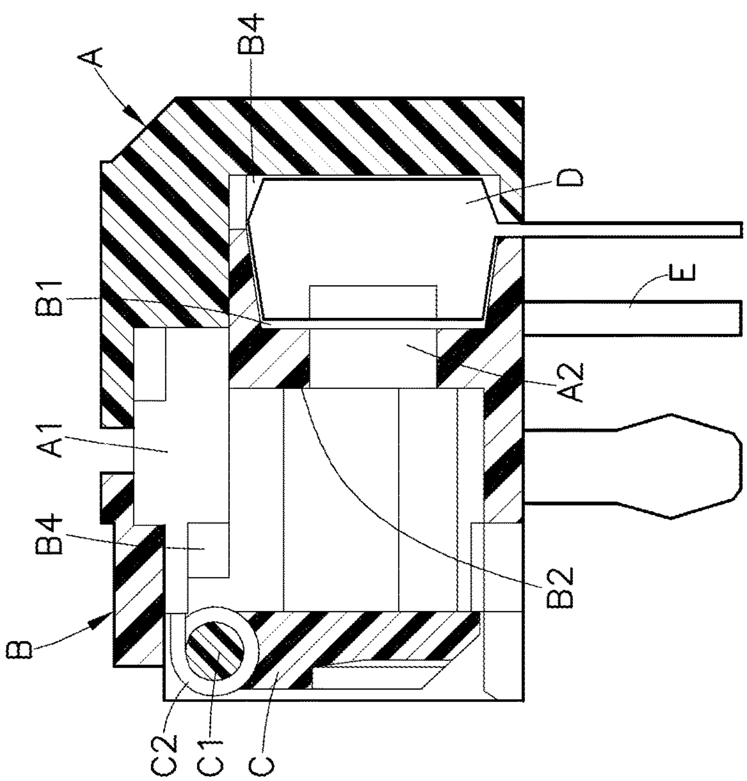
FIG. 13 is a sectional assembly side view of the fiber optic connector according to the prior art.

Referring to FIGS. 6 and 7 and FIGS. 2 and 5 again, in application of the multi-directional fiber optic connector, the fiber optic lead end connector 3 is inserted into the mating-connection portion 11 at one side of the mating-connection chamber 10 of the housing 1 to connect the fiber optic cable 32 to the housing 1. The fiber optic lead end connector 3 is affixed to one end of the fiber optic cable 32, comprising a tubular calibration support 31 axially extended out of a front side thereof to hold a fiber optic core 321 of the fiber optic cable 32, and two position-limiting ribs 33 raised from the outer perimeter at two opposite sides around the tubular calibration support 31. When going to insert the tubular calibration support 31 of the fiber optic lead end connector 3 toward the insertion hole 110 of the mating-connection portion 11, the fiber optic lead end connector 3 can be held in one of various angular positions with the position-limiting ribs 33 disposed to face toward the top side, the bottom side, the left side or the right side. When inserting the tubular calibration support 31 of the fiber optic lead end connector 3 into the insertion hole 110 of the mating-connection portion 11, the two position-limiting ribs 33 are respectively inserted into the arched grooves 1111 of two opposing guide grooves 111. When continuously inserting the fiber optic lead end connector 3 forwards, the tubular calibration support 31 of the fiber optic lead end connector 3 is inserted through the mating-connection chamber 10 into the docking channel 122 in the connecting bush 121 and the optical channel 123. At this time, the fiber optic core 321 in the tubular calibration support 31 is kept in axial alignment with the light source transceiver 21 of the optical device 2 for allowing transmission of signals between the light source transceiver 21 and the fiber optic core 321. Further, the electrical pins 22 of the optical device 2 are bonded to an external circuit board before insertion of the fiber optic lead end connector 3 into the mating-connection portion 11 to connect the fiber optic cable 32 to the housing 1. In insertion of the fiber optic lead end connector 3 into the mating-connection portion 11 of the housing 1, the two position-limiting ribs 33 are respectively inserted into the arched grooves 1111 of two opposing guide grooves 111. Thus, the arched grooves 1111 guide the tubular calibration support 31 rapidly into the mating-connection chamber 10 and the optical channel 123 for axial alignment with the light source transceiver 21 of the optical device 2. This multidirectional installation design facilitates quick installation of the fiber optic lead end connector 3 into the mating-connection portion 11 of the housing 1 without causing impact between the fiber optic lead end connector 3 and the housing 1 or damage of the fiber optic lead end connector 3. Thus, the fiber optic lead end connector 3 can be quickly and stably positioned in the mating-connection chamber 10 to enhance optical signal transmission stability.

Referring to FIGS. 8-11, in an alternate form of the present invention, the housing 1 further comprises a plug hole 16 cut through the top wall thereof near the accommodation chamber 12 within the external locating groove 13 and disposed in communication with the mating-connection chamber 10 for the mounting of a light-shielding device 4 to block between the optical channel 123 and the docking channel 122, prohibiting the light emitted by the light source transceiver 21 of the optical device 2 from passing to the outside of the housing 1. After mounting of the light-shielding device 4 in the plug hole 16, the position-limiting member 14 is mounted in the external locating groove 13 secured thereto in position by the fastening means 15 to hold down the light-shielding device 4 in the plug hole 16, prohibiting the position-limiting member 14 from falling out of the plug hole 16. The light-shielding device 4 can be made of opaque plastic, silicone or rubber, comprising a flexible light-shielding portion 41. The flexible light-shielding portion 41 can be made of flexible plastic, silicon rubber or rubber and integrally formed in the light-shielding device 4 in a crossed shape, star shape or radial configuration and extended through two opposite sides of the light-shielding device 4 so that the light-shielding device 4 can be elastically deformed in different directions.

Further, an engagement structure 17 consisting of engagement grooves 170 and engagement rails 171 is provided to enhance positioning accuracy and stability of the light-shielding device 4 in the plug hole 16. In this embodiment, the engagement grooves 170 are vertically and symmetrically located on two opposite inner sidewalk of the plug hole 16; the engagement rails 171 are vertically and symmetrically located on two opposite sides of the light-shielding device 4 for engaging into the respective engagement grooves 170. After insertion of the light-shielding device 4 into the plug hole 16, the engagement rails 171 are engaged into the respective engagement grooves 170 to secure the light-shielding device 4 firmly in the plug hole 16 with the flexible light-shielding portion 41 blocked between the docking channel 122 and the optical channel 123 to prohibit leakage of light emitted by the light source transceiver 21 into the docking channel 122, the optical channel 123 or the mating-connection chamber 10 of the housing 1 for causing interference.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A multi-directional fiber optic connector, comprising:

a housing comprising a mating-connection chamber, a mating-connection portion located at one side of said mating-connection chamber, and an accommodation chamber located at an opposite side of said mating-connection chamber, said mating-connection portion comprising an insertion hole in communication with said accommodation chamber and a plurality of guide grooves equiangularly spaced around said insertion hole; and an optical device mounted in said accommodation chamber, said optical device comprising a light source transceiver facing toward said mating-connection chamber and a plurality of electrical pins extended out of said housing for bonding to an external circuit board, wherein said insertion hole and said housing are selectively configured to provide a rectangular or polygonal shape having multiple sides, wherein said guide grooves are respectively located in the multiple sides of said insertion hole, and wherein each said guide groove comprises an arched groove extending toward said mating-connection chamber and two rectangular grooves disposed at two opposite lateral sides of said arched groove, the depth of said rectangular grooves being smaller than the depth of said arched groove.

2. The multi-directional fiber optic connector as claimed in claim 1, wherein said housing further comprises a plug hole cut through a top wall thereof within an external locating groove and disposed in communication with said mating-connection chamber, and a light-shielding device detachably mounted in said plug hole to block between said mating-connection chamber and said accommodation chamber.

* * * * *